(12) United States Patent
Shmueli

(10) Patent No.: US 11,630,808 B2
(45) Date of Patent: *Apr. 18, 2023

(54) PROOF OF LOTTERY (POL) BLOCKCHAIN

(71) Applicant: Technion Research & Development Foundation Limited, Haifa (IL)

(72) Inventor: Oded Shmueli, Nofit (IL)

(73) Assignee: Technion Research & Development Foundation Limited, Haifa (IL)

( * ) Notice: Subject to any disclaimer, the term of this patent is extended or adjusted under 35 U.S.C. 154(b) by 222 days.

This patent is subject to a terminal disclaimer.

(21) Appl. No.: 17/246,773

(22) Filed: May 3, 2021

(65) Prior Publication Data
US 2021/0255995 A1 Aug. 19, 2021

Related U.S. Application Data

(63) Continuation of application No. 16/203,670, filed on Nov. 29, 2018, now Pat. No. 10,997,125.

(Continued)

(51) Int. Cl.
*H04L 29/06* (2006.01)
*G06F 16/182* (2019.01)
(Continued)

(52) U.S. Cl.
CPC ....... *G06F 16/1824* (2019.01); *G06Q 20/065* (2013.01); *G06Q 20/223* (2013.01);
(Continued)

(58) Field of Classification Search
CPC ............ H04L 63/123; H04L 63/1416; H04L 63/20; H04L 9/0643; H04L 9/3239; H04L 9/3242; G06F 21/64
(Continued)

(56) References Cited

U.S. PATENT DOCUMENTS

| 10,291,627 B2 * | 5/2019 | Gleichauf | H04W 12/10 |
| 2019/0163672 A1 | 5/2019 | Shmueli | |
| 2020/0389309 A1 * | 12/2020 | Ricotta | H04L 9/3239 |

FOREIGN PATENT DOCUMENTS

WO WO 2020/110115 ‡ 6/2020

OTHER PUBLICATIONS

Bentov et al. "Cryptocurrencies Without Proof of Work", International Conference on Financial Cryptography and Data Security: 142-157, Aug. 31, 2016. ((Part 2).‡

(Continued)

*Primary Examiner* — Longbit Chai

(57) ABSTRACT

A method of applying proof of lottery to select block forgers in a blockchain, comprising performing the following at a certain one of a plurality of computing nodes connected to a blockchain network: (1) transmitting one or more of a plurality of participation transactions submitted by at least some of the plurality of computing nodes for participating in selection process conducted to select forgers from the plurality of computing nodes to forge blocks to be added to the blockchain; (2) determining a respective forger, during each selection process, by applying a selection function to an outcome of a hash function and a plurality of participation transactions extracted from a first subset of blocks preceding the respective block, the hash function is applied to a second subset of blocks preceding the respective block; and (3) forging the respective block in case the certain computing node is selected as the respective forger.

8 Claims, 5 Drawing Sheets

Related U.S. Application Data

(60) Provisional application No. 62/591,789, filed on Nov. 29, 2017.

(51) Int. Cl.

| | |
|---|---|
| *H04L 9/06* | (2006.01) |
| *G06Q 20/38* | (2012.01) |
| *G06Q 20/06* | (2012.01) |
| *G06Q 20/22* | (2012.01) |
| *H04L 9/32* | (2006.01) |
| *G06Q 20/40* | (2012.01) |
| *G07F 17/32* | (2006.01) |
| *H04L 9/00* | (2022.01) |

(52) U.S. Cl.
CPC ..... *G06Q 20/3829* (2013.01); *G06Q 20/4016* (2013.01); *G07F 17/329* (2013.01); *H04L 9/0643* (2013.01); *H04L 9/3239* (2013.01); *H04L 9/50* (2022.05); *H04L 2209/46* (2013.01); *H04L 2209/56* (2013.01)

(58) Field of Classification Search
USPC ........................................................ 713/168
See application file for complete search history.

(56) References Cited

OTHER PUBLICATIONS

Wang et al. "A Survey on Consensus Mechanisms and Mining Strategy Management in Blockchain Networks", Research Gate, 34P., May 2018.‡

Ogawa et al. "Proposal of Proof-of-Lucky-ID (PoL) to Solve the Problems of PO W and PoS", IEEE International Conference on Internet of Things and IEEE Green Computing and Communications (GreenCom) and IEEE Cyber, Physical and Social Computing (CPSCom) and IEEE Smart Data (SmartData): 1212-1218, Jun. 3, 2019.‡

Bentov et al. "Cryptocurrencies Without Proof of Work", International Conference on Financial Cryptography and Data Security: 142-157, Aug. 31, 2016. (Part 1).‡

International Search Report and the Written Opinion dated Mar. 5, 2020 From the International Searching Authority Re. Application No. PCT/2019/051296. (11 Pages).‡

Hyperledger White Paper Working Group "An Introduction to Hyperledger", Hyperledger White Paper Working Group, p. 1-33, Aug. 2018.‡

Gilad et al. "Algorand: Scaling Byzantine Agreements for Cryptocurrencies", Proceedings of the 26th Symposium on Operating Systems Principles, SOSP'17, Shanghai, China, Oct. 28, 2017, p. 1-24, Oct. 28, 2017.‡

Zhang et al. "REM: Resource-Efficient Mining for Blockchains", Proceedings of the 26th USENIX Security Symposium, Vancouver, BC, Canada, Aug. 16-18, 2017, p. 1427-1444, Aug. 16, 2017.‡

King et al. "PPCoin: Peer-to-Peer Crypto-Currency With Proof-of-Stake", Self-Published Paper, 6 P., Aug. 19, 2012.‡

Bentov et al. "Proof of Activity: Extending Bitcoin's Proof of Work via Proof of Stake", ACM SIGMETRICS Performance Evaluation Review, 42(3): 1-19, Dec. 2014.‡

Chen et al. "Algorand", arXiv Preprint arXiv: 1607.01341v9, p. 1-75, May 26, 2017.‡

Bentov et al. "Cryptocurrencies Without Proof of Work", International Conference on Financial Cryptography and Data Security, Conference Paper, LNCS, 9604: 142-157, Published Online Aug. 31, 2016.‡

Ateniese et al. "Proofs of Space: When Space Is of the Essence", Proceedings of the 9th International Conference on Security and Cryptography for Networks, SCN 2014, Amalfi, Italy, Sep. 3-5, 2014, LNCS 8642: 538-557, Sep. 3, 2014.‡

Notice of Allowance dated Jan. 6, 2021 from the US Patent and Trademark Office Re. U.S. Appl. No. 16/203,670. (15 pages).

Bentov et al. "Cryptocurrencies Without Proof of Work", International Conference on Financial Cryptography and Data Security: 142-157, Aug. 31, 2016. (Part I).

Bentov et al. "Cryptocurrencies Without Proof of Work", International Conference on Financial Cryptography and Data Security: 142-157, Aug. 31, 2016. (Part II).

Baldimtsi et al. "Anonymous Lottery in the Proof-of-Stake Setting", 2020 IEEE 33rd Computer Security Foundations Symposium, CSF, Boston, MA. USA. Jun. 22-26, 2020, p. 1-32, Jun. 22, 2020.

Kume et al. "Lottery Protocol for Cryptocurrency", The Institute of Electronics, Information and Communication Engineers, The 32nd Symposium on Cryptography and Information Security, Kokura, Japan, Jan. 20-23, 2015, p. 1-5, Jan. 20, 2015.

\* cited by examiner
‡ imported from a related application

PROOF OF LOTTERY (POL) BLOCKCHAIN

RELATED APPLICATIONS

This application is a continuation of U.S. patent application Ser. No. 16/203,670 filed on Nov. 29, 2018, which claims the benefit of priority under 35 USC § 119(e) of U.S. Provisional Patent Application No. 62/591,789 filed on Nov. 29, 2017. The contents of the above applications are all incorporated by reference as if fully set forth herein in their entirety.

FIELD AND BACKGROUND OF THE INVENTION

The present invention, in some embodiments thereof, relates to selecting block forgers in a blockchain, and, more specifically, but not exclusively, to applying Proof of Lottery (PoL) to select block forgers in a blockchain.

Blockchain networks comprising a community of computing nodes constructed or formed to manage and maintain blockchains have become a major interest for a plurality of applications and uses. The blockchain networks are deployed to facilitate distributed ledgers for a plurality of uses and applications, for example, cryptocurrency, smart contracts, activity tracking, data logging and management and/or the like. The distributed ledgers stored simultaneously by a plurality untrusted community members may be constantly and transparently updated to record transactions made in the blockchain network.

Having no trusted central control, trust becomes a major concern for the community members since the computing nodes are unfamiliar with each other and may therefore be unable to trust each other in attempt to reach a consensus. This may be fertile ground for malicious parties which may attempt to manipulate the blockchain to their own benefit.

In order to overcome the trust hurdle and enable the community of untrusted members to reach consensus, a plurality of trust and consensus protocols have been introduced to fulfill several criteria essential for the community of distributed untrusted members to maintain the distributed ledgers in a secure and undisputed manner Some of the major features characterizing the blockchain protocol include decentralization of consensus as there is no central trusted entity, transparency to ensure all records are auditable to the community members, security of the records to make them irreversible and thus immune to tampering and immutability to verify non-reproduction and irreversibility of the records.

SUMMARY OF THE INVENTION

According to a first aspect of the present invention there is provided a computer implemented method of applying proof of lottery to select block forgers in a blockchain, comprising using one or more processors of a certain one of a plurality of computing nodes connected to a blockchain network, the processor(s) is used for:
  Transmitting, to the blockchain network, one or more of a plurality of participation transactions submitted by at least some of the plurality of computing nodes for participating in one or more selection processes conducted to select one or more forgers from the plurality of computing nodes to forge one or more blocks to be added to the blockchain.
  Determining the forger(s), during each selection process, by applying a selection function to an outcome of a hash function and a plurality of participation transactions extracted from a first subset of blocks preceding the block(s) in the blockchain. The hash function is applied to a second subset of blocks preceding the block(s).
  Forging one or more of the block(s) in the blockchain in case the certain computing node is selected as one of the forger(s).

According to a second aspect of the present invention there is provided a computing node applying proof of lottery to select block forgers in a blockchain, comprising:
  A communication interface for communicating with a plurality of computing nodes connected to a blockchain network.
  A program store for storing a code.
  One or more processors coupled to the communication interface and to the program store. The processor(s) executes the code which comprises:
    Code instruction to transmit, to the blockchain network, one or more of a plurality of participation transactions submitted by at least some of the plurality of computing nodes for participating in one or more selection processes conducted to select one or more forgers from the plurality of computing nodes to forge one or more blocks to be added to the blockchain.
    Code instructions to determine the forger, during the one or more selection processes, by applying a selection function to an outcome of a hash function and a plurality of participation transactions submitted by at least some of the plurality of computing nodes and extracted from a first subset of blocks preceding the block(s) in the blockchain. The hash function is applied to a second subset of blocks preceding the block(s).
    Code instruction to forge one or more of the block(s) in the blockchain in case the certain computing node is selected as one of the forger(s).

According to a third aspect of the present invention there is provided a blockchain network applying proof of lottery to select block forgers in a blockchain, comprising a plurality of computing nodes connected to a blockchain network. wherein at least some of the plurality of computing nodes are adapted to transmit to the blockchain network a plurality of participation transactions for participating in a plurality of selection processes conducted to select forgers from the plurality of computing nodes to forge each of a plurality of blocks to be added to the blockchain, during each of the plurality of selection processes one or more forgers are selected for forging one or more of the plurality of blocks to be added by applying a selection function to an outcome of a hash function and a plurality of participation transactions submitted by at least some of the plurality of computing nodes and extracted from a first subset of blocks preceding the respective one of the plurality of blocks to be added in the blockchain where the hash function is applied to a second subset of blocks preceding the respective block to be added, the forger(s) selected in each selection process forges the respective block(s).

In a further implementation form of the first, second, and/or third aspects, the plurality of participation transactions extracted from the first subset of blocks are logged in the first subset of blocks as cryptocurrency transactions transmitted by at least some of the plurality of computing nodes for participating in one or more of the selection processes.

In a further implementation form of the first, second, and/or third aspects, one or more other selection processes are conducted to determine one or more other forgers for forging one or more of the blocks in case the selected forger(s) fails to forge one or more of the block(s) within a predefined time period.

In an optional implementation form of the first, second, and/or third aspects, one or more of the other selection processes are conducted by applying the selection function to the outcome of the hash function and the plurality of participation transactions extracted from the first subset of blocks from which one or more participation transaction transmitted by the failed forger are excluded.

In an optional implementation form of the first, second, and/or third aspects the forger selected in one or more of the other selection processes is granted an increased predefined time period for forging the block(s).

In an optional implementation form of the first, second, and/or third aspects, one or more of the selection processes are conducted by applying the selection function to the outcome of the hash function and a plurality of participation transactions extracted from a third subset of blocks which is shifted compared to the first subset of blocks to include blocks of the blockchain which precede the blocks of the first subset of blocks.

In an optional implementation form of the first, second, and/or third aspects, one or more of the selected forger(s) share a reward due for forging the block(s) with one or more other computing nodes selected by applying the selection function to the plurality of participation transactions extracted from the first subset and to the outcome of one or more hash functions applied to a subset of blocks comprising the first subset, the second subset, the currently added block(s) and a succeeding block to be added to the blockchain following the currently added block(s).

In an optional implementation form of the first, second, and/or third aspects, one or more of the selection processes are conducted to select multiple forgers from the plurality of computing nodes for forging multiple subsequent blocks to be added to the blockchain, each of the multitude of forgers is selected by applying the selection function to the plurality of participation transactions extracted from the first subset and to the outcome of a respective one of a plurality of hash functions applied to the second subset.

In an optional implementation form of the first, second, and/or third aspects, one or more of the other selection processes are conducted by applying the selection function to the outcome of the hash function and the plurality of participation transactions extracted from the first subset of blocks from which one or more participation transaction transmitted by the failed forger are excluded.

In an optional implementation form of the first, second, and/or third aspects, one or more backup forgers are selected for forging one or more of the subsequent multiple blocks to be added to the blockchain by applying the selection function using a number of the plurality of hash functions larger than the number of multiple subsequent blocks, one or more of the backup forger forge one or more of the multitude of blocks in case the forger selected to forge the respective block fails to forge the respective block within a predefined time period.

In an optional implementation form of the first, second, and/or third aspects, a voting algorithm is applied to determine one or more of the forgers during one or more of the selection processes, the voting algorithm comprising:

Selecting, based on manipulation of each block of a fourth subset of blocks preceding the block(s) in the blockchain, a respective winning participation transaction from the plurality of participation transactions extracted from the respective block of the fourth subset.

Aggregating a count of the winning participation transaction selected in each of the blocks of the fourth subset to identify one or more highest winning participation transactions which are selected as the winning participation transactions in a highest number of blocks of the fourth subset.

Selecting a computing node associated with the winning participation transaction having a highest count as the forger.

In a further implementation form of the first, second, and/or third aspects, the manipulation of each of the blocks of the fourth subset comprises applying one or more hash functions to the respective block of the fourth set and identifying the respective winning participation transaction by applying a modulo operation to the outcome of the hash function(s) where a divisor in the modulo operation is a number of the plurality of participation transactions extracted from the first subset of blocks.

In an optional implementation form of the first, second, and/or third aspects, selection of winning participation transactions for each block of the fourth subset is extended by applying multiple different manipulations to each block to increase a number of selected winning participation transactions thus reducing a probability of a tie between multiple computing nodes associated with an equal count of winning participation transactions.

In an optional implementation form of the first, second, and/or third aspects, in case of a tie between multiple computing nodes associated with an equal count of winning participation transactions, selecting as the forger one or more tied computing nodes associated with respective operational parameter(s) as defined by one or more selection rules.

In a further implementation form of the first, second, and/or third aspects, the computing node selected as the forger includes a proof of eligibility in the forged block, the proof of eligibility is checked by one or more other computing nodes of the plurality of computing nodes to verify the forger is the selected computing node.

In an optional implementation form of the first, second, and/or third aspects, a cryptocurrency value of each of the plurality of participation transactions is erased from circulation of the cryptocurrency.

In a further implementation form of the first, second, and/or third aspects, the selected forger receives a reward for forging one or more of the blocks, the reward comprises a cryptocurrency transaction made to the selected forger.

In a further implementation form of the first, second, and/or third aspects, the reward comprises a fraction of the aggregated value of the plurality of participation transactions.

In a further implementation form of the first, second, and/or third aspects, a predefined number of initial blocks of the blockchain are created using one or more different selection processes conducted to select forgers of the initial blocks, the predefined number of initial blocks is equal or larger than a sum of the number of blocks in the first subset and the number of blocks in the second subset.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS OF THE INVENTION

Figure 1:
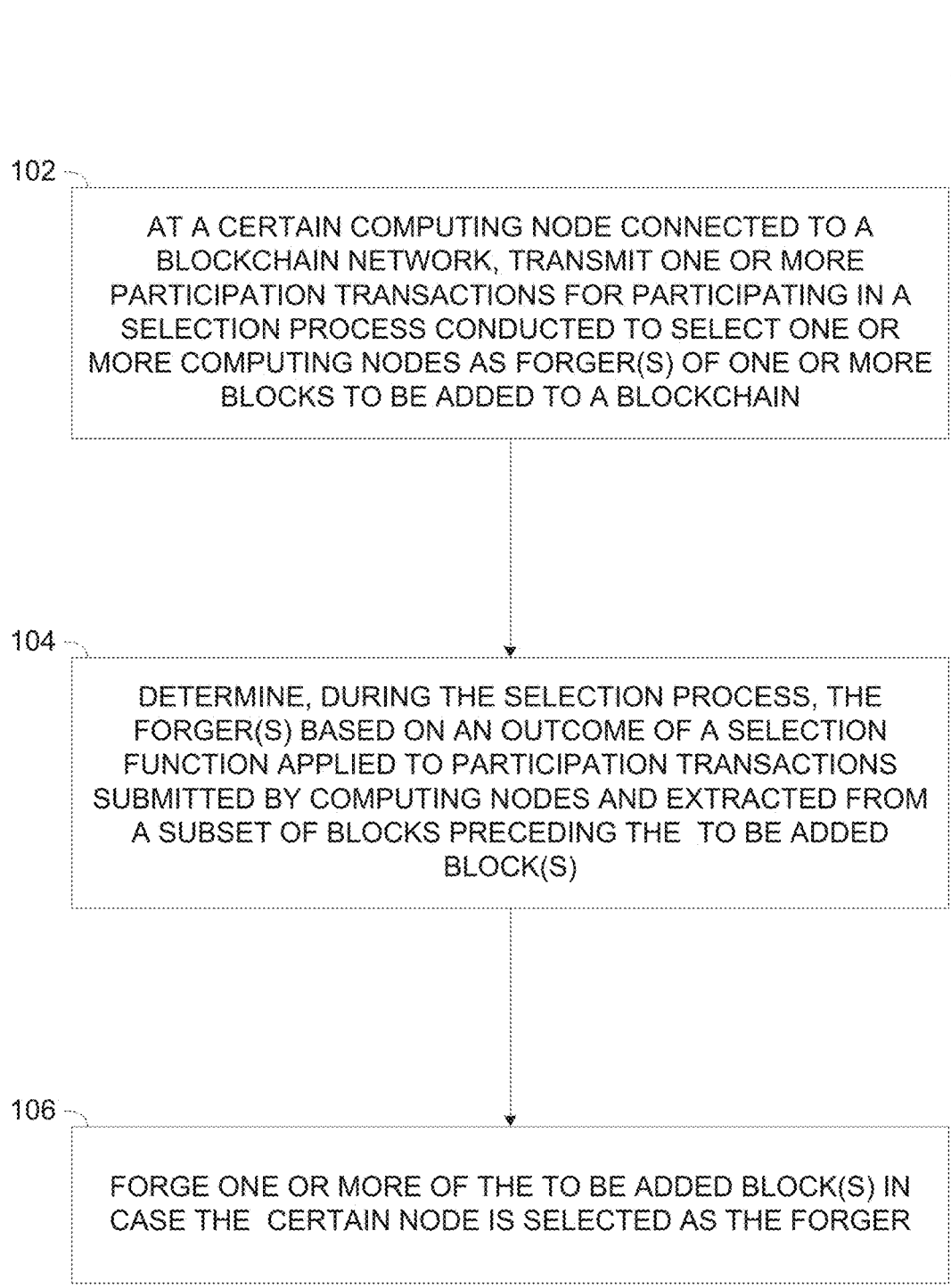
FIG. 1 is a flowchart of an exemplary process of applying proof of lottery to select block forgers in a blockchain, according to some embodiments of the present invention.

The present invention, in some embodiments thereof, relates to selecting block forgers in a blockchain, and, more specifically, but not exclusively, to applying PoL to select block forgers in a blockchain.

According to some embodiments of the present invention, there are provided methods, systems and computer program products for applying PoL to select computing nodes, for example, a computer, a server, a network node, a processing node, a cloud computing service and/or the like connected to a blockchain network (community) as forgers to forge (create, produce) blocks of a private, public and/or consortium blockchain facilitating a distributed ledger for one or more applications, for example, cryptocurrency, smart contracts, activity tracking, distributed database and/or the like.

Each block in the blockchain is forged by a certain one of the community of computing nodes connected to the blockchain network. To this end, upon addition of each block to the blockchain, a selection process (i.e., lottery) is conducted for selecting the forger of a subsequent block to be added to the blockchain.

Each of at least some of the computing nodes interested in participating in one or more specific selection processes in attempt to be selected as the forger of the respective block(s) may transmit one or more participation transactions (i.e., lottery tickets) to the blockchain network. Each participation transaction is eligible for one or more specific selection processes, in particular a group of one or more subsequent selection processes for selecting the forger of certain respective blocks. A participation transaction is a special payment transaction that is legal in that it is eligible to consume the resources it claims to have as verified by the blockchain protocol. Naturally, the more participation transactions a certain computing node submits the higher the probability that one of these participation transactions is selected as a winning participation transaction and hence the higher is the chance of the certain computing node to be selected as the forger. Each of the participation transactions which is typically a cryptocurrency transaction having a predefined value (e.g., a bitcoin value) is recorded in one of the blocks in the blockchain preceding the block to be added.

Each selection process may be conducted simultaneously by one or more of the computing nodes to determine a selected one of the computing nodes of the community as the forger of the respective block to be added to the blockchain by selecting the wining participation transaction from the plurality of participation transactions submitted and eligible for the respective (specific) selection process. As stated herein before, eligible participation transactions are legal participation transactions which are directed for participating in the group of subsequent selection processes and having the resources credit for the required cryptocurrency value. The computing node which transmitted the winning participation transaction is selected as the forger of the respective block.

The selection process is carried out by applying a selection function to a plurality of participation transactions eligible for the specific selection process which are extracted form a first subset of blocks preceding the respective block to be added to the blockchain.

In order to ensure the blockchain security, irreversibility and immutability of the blockchain and moreover to prevent attacks launched by malicious computing nodes of the community, the selection function is based on a hash function whose inverse presents a computation intensive challenge directed to prevent fraudulently influencing the selection process. The computation challenge is achieved by applying to a second subset of blocks preceding the respective block one or more cryptographic one-way hash functions, requiring major processing resources and/or time for computing an input block for ensuring a given output. Therefore while computing the selection function requires low computing resources to determine the winning participation transaction, experimenting with possible input blocks to achieve a desired output, i.e., a desired winning participation transaction (and hence a desired computing node to be selected as the forger) may require extensive computing resources. The scope of processing resources and/or time may thus prevent the malicious node(s) from determining, predicting and/or guessing the input required for a desired output, i.e., a desired winning participation transaction. The number of blocks in the second subset may be defined according to one or more parameters of the blockchain, for example, a trustworthiness of the computing nodes (private vs. public blockchain), a number of computing nodes, a number of transactions in the blockchain network, a frequency of blocks forging and/or the like.

The selection function is deterministic such that any of the computing nodes computing the selection function determines the same participation transaction as the wining participation transaction in each selection process and thus determines the same computing node associated with the wining participation transaction as the forger of the respective block.

The computing node associated with the wining participation transaction may then forge the (subsequent) block to be added to the blockchain. The computing node which forged the newly added block may insert a proof of eligibility in the newly added block to prove it is indeed the computing node selected as the forger. For example, the participation transaction may be a multi-output transaction as known in the art which comprises two outputs, a first output is transmitted to the blockchain network for participating in the selection process(es) and a second output is stored at the computing node which submitted the participation transaction. The computing node selected to forge the block may prove its eligibility as the forger by redeeming the second output of the winning participation transaction in a designated transaction within the transactions included in the newly forged block. This enables all computing nodes to verify the eligibility of the forging computing node. Other similar mechanisms as known in the art based on a public key of the winning node owning the winning transaction will be apparent to those versed in the art.

The forger may be rewarded for forging the block in order to motivate computing nodes to participate in the selection processes and maintain the blockchain. The reward may be, for example, a predefined fraction of the value of the participation transactions applicable for the respective selection process. Optionally, the value of the participation transactions is erased from circulation of the cryptocurrency thus increasing the value of the cryptocurrency reward received by the forger for constructing a new block.

Optionally, one or more mitigation measures are employed to further reduce vulnerability of the selection process to malicious attacks initiated by one or more of the malicious computing nodes optionally colluding together in attempt to influence the selection process. The malicious computing node(s) may attempt to influence the selection process to determine a certain computing node with which they may share its reward. In particular, such measures may be directed to reduce the dominancy, weight and/or contribution a forger of the most recently added block may have in determining the forger selected to forge the subsequent block. The forger of the most recent block which is a malicious computing node may attempt to manipulate the most recently added block in attempt to direct the outcome of the second subset manipulation in order to control selection of the forger of the subsequent block.

A first exemplary mitigation measure is directed to forcing the selected forger to share his reward with one or more other computing nodes selected based on manipulation of one or more blocks that will be added subsequently to the respective block for which the selection process is conducted. Since these subsequent blocks are not yet known at the time of the selection process, a forger of the previously added block (most recently added block) which is a malicious computing node may be unable to predict the other computing nodes which will receive a share of the reward. The malicious computing node may therefore be unable to collude with the sharing computing node(s) as well as with the selected forger having significantly reduced motivation to further share his reward with the malicious node.

A second exemplary mitigation measure is directed to selecting multiple computing nodes as forgers of respective blocks in a single selection process. As such the forger of each block is selected significantly earlier than the time of forging the most recent block thus reducing the impact of the forger of the most recently added block which is a malicious computing node.

A third exemplary mitigation measure is directed to reducing the weight, contribution and/or impact of the most recently added block in the selection process. In this implementation, a respective winning participation transaction may be selected by equally applying a voting algorithm to a subset of blocks preceding the respective block to be added to the blockchain. The selection results made based on each of the blocks may be aggregated and a participation transaction having a highest count of winning participation transactions in the plurality of blocks may be selected as the overall winning participation transaction and its associated computing node may be selected as the forger.

The PoL is based on selecting the forger based on participation transactions submitted and recorded (logged) in blocks preceding the respective block for which the selection process is conducted. The PoL is further based on the selection function which is based on manipulating blocks preceding the respective block. An initial number of blocks must therefore be created and added to the blockchain before the PoL may be launched. To overcome this limitation, the initial blocks may therefore be created (mined) using one or more other selection processes, for example, Proof of Work (PoW), Proof of Stake (PoS), Proof of Burn, Proof of Storage and/or the like as known in the art. After the initial blocks are created, the PoL selection process may be launched for selecting the forgers of subsequent blocks.

Applying the PoL for establishing trust in the blockchain network and selecting the forger of blocks in the blockchain may present significant advantages and benefits compared to currently existing blockchain systems, methods, algorithms and/or protocols.

One of the most prominent existing blockchain algorithms is the PoW. The PoW algorithm is based on introducing a computation intensive challenge (which is increasingly made more difficult) which the computing nodes compete in solving where the first to solve (mine) is the one that is rewarded. This algorithm requires investing major and ever increasing computing resources which translate to huge energy investments that are costly and inflict destructive environmental impact. The PoL on the other hand requires very little computation resources thus significantly reducing the cost. The PoL is also environment-friendly as the energy investment is significantly low. Moreover, due to the high energetic requirements, the PoW may lead to extensive collaboration between major participants in the computing nodes community which may result in domination of the community by a small number of participants.

Other blockchain algorithms such as PoS, Proof of Burn, Proof of Storage and/or the like are based on selecting the block creators according to their stakes, assets and/or resources. The more stakes, assets and/or resources a member of the community has the larger is the chance for this member to be selected as the creator of the blocks which may lead to domination of the blockchain by community members having extensive stakes (assets, resources) or community members which have extensive past activity on the blockchain network. In contrast the PoL is based on participation transactions which are each associated with (eligible for) a limited number of specific selection processes, in particular a group of subsequent selection processes. As such, every selection process may be regarded as an independent process which is unrelated to the overall assets the member (i.e., the computing node) may have but only to the resources the computing node is willing to sacrifice for participating in the specific selection process separately.

Moreover, by applying the mitigation measures, the PoL is made highly robust and significantly immune to many forms of malicious attacks initiated by malicious parties (malicious computing nodes within the community) in attempt to manipulate the selection processes to their advantage.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process of applying proof of lottery to select block forgers in a blockchain, according to some embodiments of the present invention. An exemplary process 100 may be executed by each of at least some of a plurality of computing nodes, for example, a computer, a server, a processing node, a network node, a cloud computing resource, a Smartphone, a tablet and/or the like connected to a blockchain network to apply PoL for selecting one or more forgers (i.e. producer, creator, etc.) to forge one or more block to be added the blockchain.

One or more of the computing nodes may transmit one or more participation transactions (which may be regarded as lottery tickets) for participating in one or more selection processes (lotteries) conducted to select one or more forgers of one or more blocks to be added (in a future time) to the blockchain. Each of the participation transactions is therefore applicable for participating only in certain one or more of the selection processes conducted to select the forger of one or more specific blocks. Each of the participation transactions is a cryptographic currency transaction with a predefined value which is visible to all computing nodes connected to the blockchain network and is recorded in the blockchain, i.e. in a block of the blockchain.

Every time a block is forged and added to the blockchain a selection process is conducted to select one or more forgers for forging one or more subsequent blocks (i.e., subsequent to the most recently added block) to be added to the blockchain.

The selection process conducted simultaneously by at least some of the computing nodes is directed to select a wining participation transaction from a plurality of participation transactions which are eligible for the respective selection process and extracted from a first subset of blocks preceding the block to be added to the blockchain. The computing node which transmitted the winning participation transaction (as recorded in the blockchain) is therefore selected as the forger of the subsequent block to be added to the blockchain.

In order to maintain the blockchain security, irreversibility and immutability for verifying non-reproduction and irreversibility of the blockchain, the selection function also implies a computation challenge, that of selecting a specific winning transaction, in which a second subset of blocks preceding the block to be added to the blockchain is manipulated in a manner that prevents determining and selecting specific computing nodes as the forgers. For example, the manipulation may be implemented by applying one or more cryptographic one-way hash functions to the second subset of blocks. The second subset of blocks may be different and/or overlap the first subset of blocks. Therefore while computing the selection function requires low computing resources (e.g., processing power, time, storage capacity, etc.) to determine the winning participation transaction, experimenting with possible input block contents to achieve a desired output, i.e., a desired winning participation transaction for forging the block to be added and deciding on a desired computing node to be selected as the forger, may require extensive computing resources. In particular, the computation challenge is imposed to prevent the forger of the most recently added block (i.e., the block immediately preceding the block to be added) from manipulating the immediately preceding block in attempt to decide the identity of the desired computing node. Since the immediately preceding block is part of the second subset of blocks, manipulating the immediately preceding block may alter the outcome of the hash function(s) applied to the second subset. The forger of the immediately preceding block may attempt to manipulate the immediately preceding block by manipulating transactions, manipulating data values of transactions, manipulate its own (the forger of the immediately preceding block) identity value and/or the like. Only legal participation transactions which prove ownership of their consumed resources are considered in selection processes.

Since the selection function is deterministic and is applied to the subsets of blocks visible to all the computing nodes, all the computing nodes conducting the selection process select the same wining participation transaction.

The computing node associated with the wining participation transaction may then forge the (subsequent) block to be added and add the forged block to the blockchain. To verify the block was indeed forged by the computing node selected as the forger, the forger may insert a proof of eligibility to prove it is indeed the owner of the winning participation transaction and is thus eligible for forgoing the block. There are several mechanisms based on public keys as known in the art that will be apparent to those versed in the art that can be used to provide a proof that the winning transaction is indeed owned by the forger.

Figure 2:
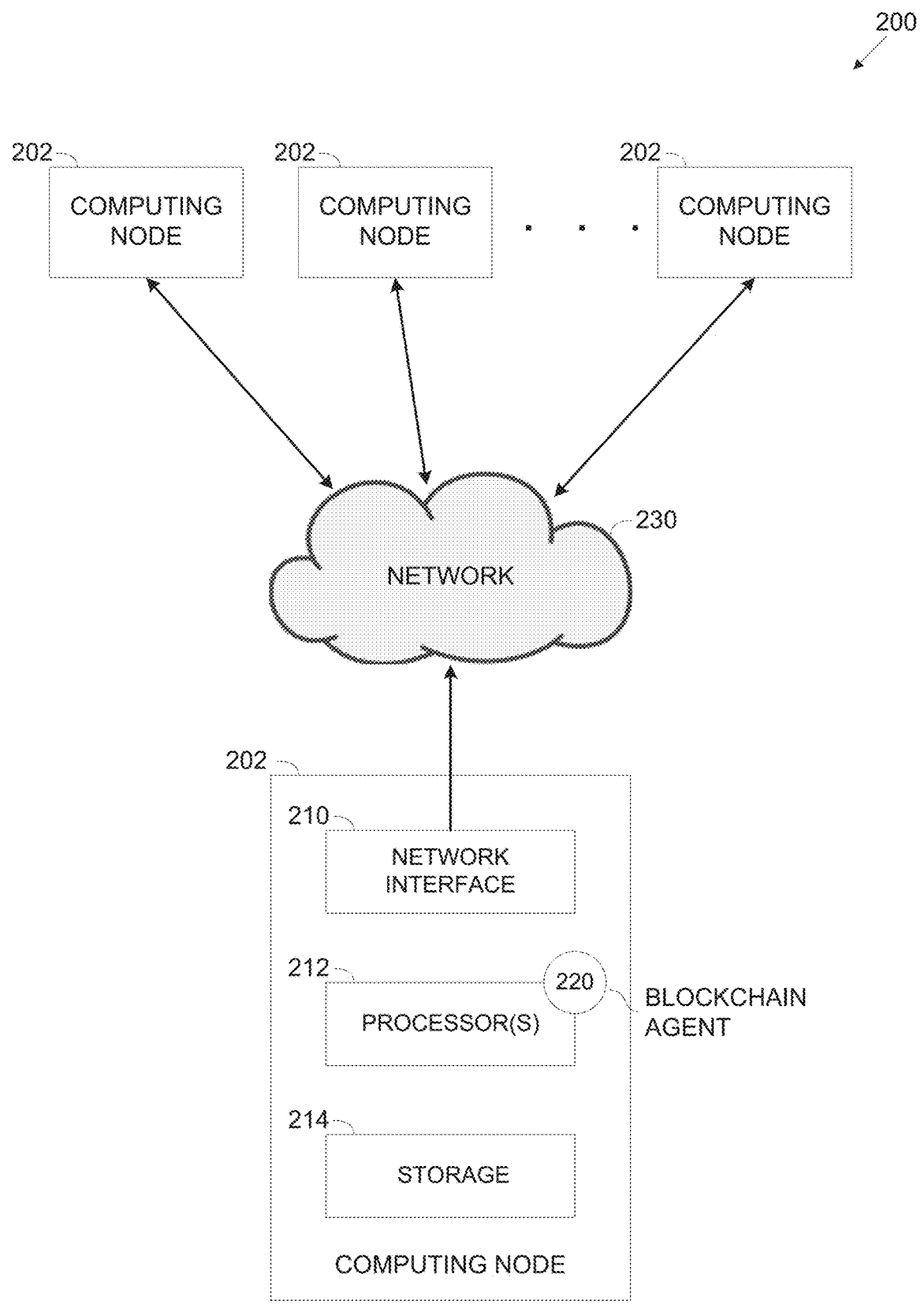
FIG. 2 is a schematic illustration of an exemplary blockchain network applying proof of lottery to select block forgers in a blockchain, according to some embodiments of the present invention.

Reference is also made to FIG. 2, which is a schematic illustration of an exemplary blockchain network applying proof of lottery to select block forgers in a blockchain, according to some embodiments of the present invention. An exemplary blockchain network 200 may be applied to maintain and manage one or more private, public and/or consortium blockchains facilitating a distributed ledger for one or more applications, for example, cryptocurrency, smart contracts, distributed database and/or the like. The blockchain network 200 consists of a community of computing nodes 202, for example, a computer, a server, a processing node, a network node, a cloud computing resource, a Smartphone, a tablet and/or any device having one or more processing units which are typically untrusted and may therefore apply the PoL blockchain protocol to establish trust and maintain the blockchain fundamental criteria, specifically, security, irreversibility and immutability.

The plurality of computing nodes 202 may communicate with other computing nodes 202 via a network 230 comprising one or more wired and/or wireless networks, for example, a Local area Network (LAN), a Wireless LAN (WLAN), a Wide Area Network (WAN), a Municipal Area Network (MAN), a cellular network, the internet and/or the like.

Each of the computing nodes may include a network interface 210 for connecting to the network 230, a processor(s) 212 for executing a process such as the process 100 and storage 214 for storing code (program store) and/or data. The network interface 210 may include one or more wired and/or wireless network interfaces, for example, a LAN interface, a WAN interface, a MAN interface, a WLAN (e.g., Wi-Fi) interface, a cellular interface and/or the like for connecting to the network 230. The processor(s) 212, homogenous or heterogeneous, may include one or more processing nodes arranged for parallel processing, as clusters and/or as one or more multi core processor(s). The storage 214 may include one or more non-transitory memory devices, either persistent non-volatile devices, for example, a ROM, a Flash array, a hard drive, an SSD, a magnetic disk and/or the like and/or one or more volatile devices, for example, a RAM device, a cache memory and/or the like. The storage 214 may further comprise one or more network storage resources, for example, a storage server, a network accessible storage (NAS), a network drive, a cloud storage and/or the like accessible via the communication interface 210.

The processor(s) 212 of each computing node 202 may execute one or more software modules such as, for example, a process, a script, an application, an agent, a utility, a tool and/or the like each comprising a plurality of program instructions stored in a non-transitory medium (program store) such as the storage 214 and executed by one or more processors such as the processor(s) 212. For example, the processor(s) 212 may execute a blockchain agent 220 for participating in the blockchain maintenance and executing the process 100.

As shown at 102, the blockchain agent 220 of one or more of the computing nodes 202 which is interested in forging one or more new blocks in the blockchain transmits one or more participation transactions to the blockchain network 200. Each of the participation transactions is a cryptocurrency transaction having a predefined value M, for example, 0.000012 bitcoins and/or the like and may be therefore considered as purchasing a lottery ticket for participating in one or more certain selection processes (i.e. lotteries, raffles) conducted to select forger(s) of certain block(s) to be added (in a future time) to the blockchain. As such each of the participation transactions is directed to participate in one or more specific selection processes, in particular a group of one or more subsequent selection processes conducted to select the forger(s) of specific block(s). The participation cost, i.e., predefined value M of each participation transaction may increase over time as the blockchain expands.

As shown at 104, after a new block is forged and added to the blockchain, the blockchain agent 220 determines, during a certain selection process, one or more forgers selected to forge one or more blocks to be added to the blockchain subsequently to the newly (and hence most recently) added block.

To determine the selected forger(s), the blockchain agent 220 may apply a deterministic selection function F to the participation transactions submitted by one or more of the computing nodes 202 and which are directed for participating in the certain selection process. These participation transactions may be extracted from a first subset of blocks in the blockchain which precede the block(s) to be added for which the selection process is conducted.

Moreover, the selection function F applied by the blockchain agent 220 is further applied to a manipulation of a second subset of blocks preceding the block(s) to be added. For example, the selection function F may be applied to an outcome of a manipulation, for example, a hash function H applied to the second subset of blocks. The hash function H is a cryptographically secure function, for example, SHA-1, SHA-2, SHA256 and/or the like. This is done to present a computation challenge which may be essential to maintain the blockchain security, irreversible and immutability for verifying non-reproduction and irreversibility of the blockchain.

The number of blocks selected for the first and/or second subsets may be predefined according to one or more operational parameters of the blockchain and/or the blockchain network 200. The operational parameters may relate to, for example, the number of computing nodes 202 connected to the blockchain network 200, the application facilitated by the blockchain, number of transactions recorded by the blockchain, frequency of blocks forging, required security level, trustworthiness of the computing nodes 202 and/or the like. For example, the more trusted are the computing nodes 202, the number of blocks in the subset(s) may be smaller. For example, in case of a private blockchain in which the computing nodes 202 are considered trusted, the number of blocks in the subset(s) may be reduced. In contrast, the less trusted are the computing nodes 202, the number of blocks in the subset(s) may be higher. For example, in case of a public blockchain in which the computing nodes 202 are regarded as untrusted, the number of blocks in the subset(s) may be increased.

The blockchain is visible to all of the computing nodes 202 such that the participation transactions and the blockchain blocks are viewed identically by all of the computing nodes 202. Due to identical view and the fact that the selection function F is deterministic the selection process conducted by each of the blockchain agent 220 instances executed by any of the computing nodes 202 will produce the same winning purchasing transaction(s).

The output of the selection function F comprises one or more winning purchasing transactions and the selected forger(s) are the computing node(s) 202 associated with the winning purchasing transaction(s), i.e., the computing node(s) 202 which transmitted the winning purchasing transaction(s).

Figure 3A:
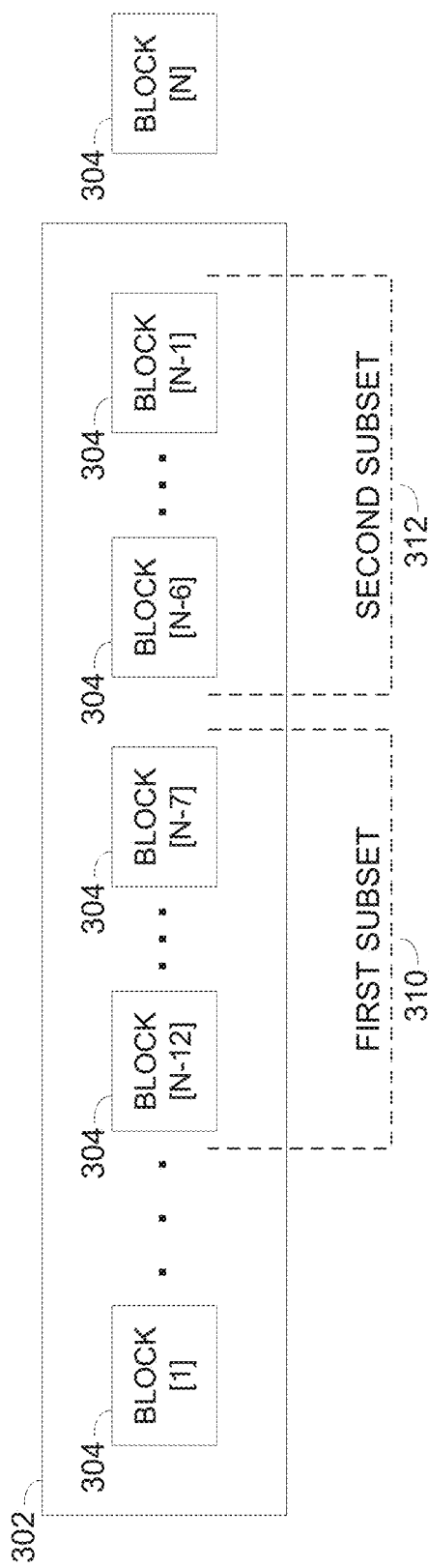
FIG. 3A, FIG. 3B and FIG. 3C are schematic illustrations of an exemplary blockchain constructed using proof of lottery to select block forgers in the blockchain, according to some embodiments of the present invention.
Figure 3B:
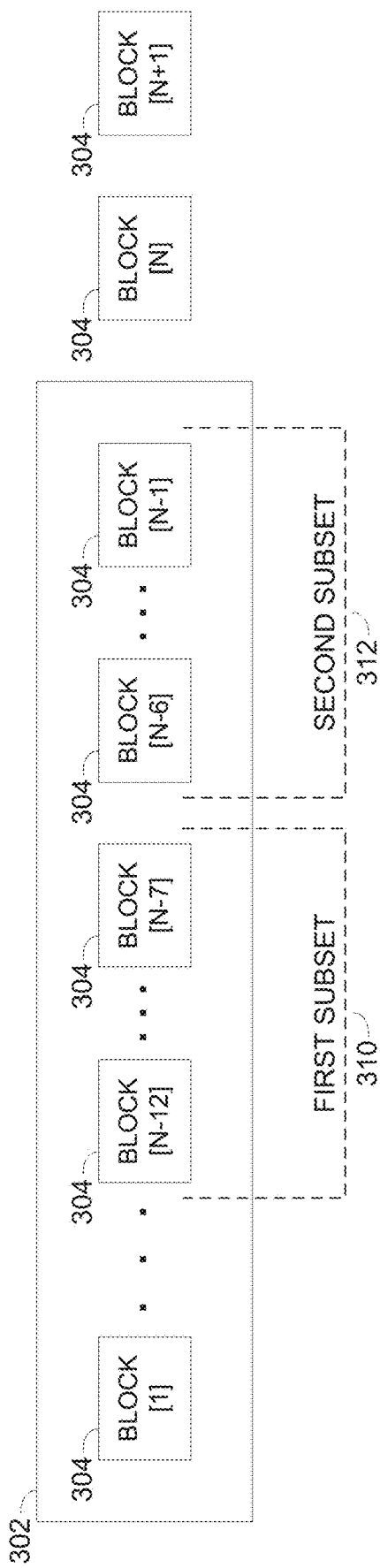
Figure 3C:
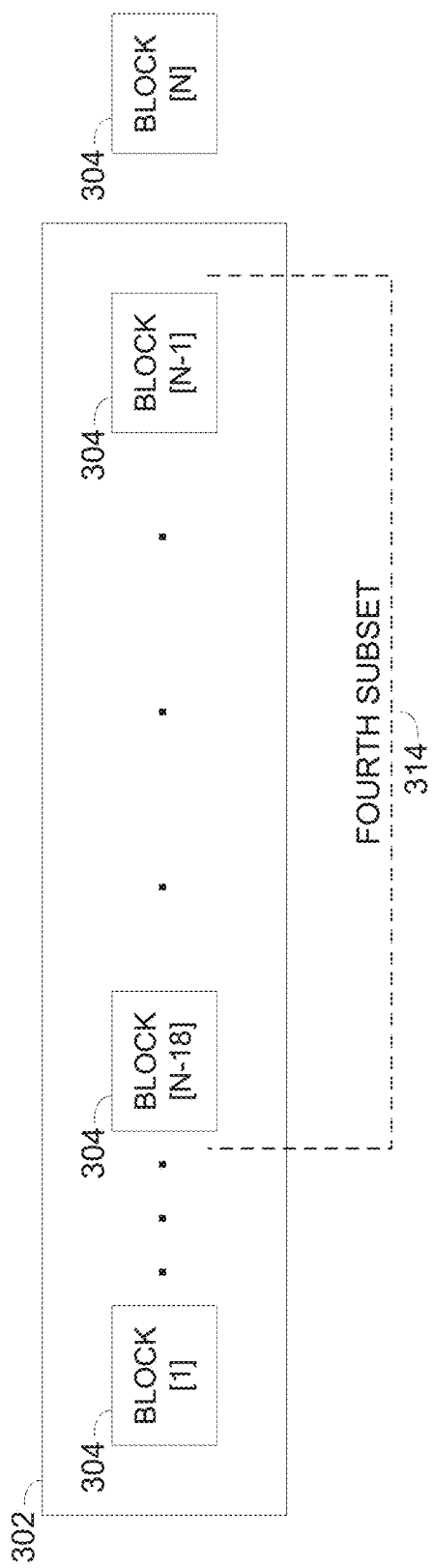

Reference is now made to FIG. 3A, FIG. 3B and FIG. 3C, which are schematic illustrations of an exemplary blockchain constructed using proof of lottery to select block forgers in the blockchain, according to some embodiments of the present invention.

As seen in FIG. 3A an exemplary blockchain 302 includes a plurality of blocks 204 forged (created) by a blockchain agent such as the blockchain agent 220 executed by one or more computing nodes such as the computing nodes 202 connected to a blockchain network such as the blockchain network 200. The first block 304 of the blockchain 302 is naturally block [1] 304 and the blockchain 302 is constantly evolving and added with new block 304 forged to record transaction data of transactions made in the blockchain network 200. Each of the blocks 304 is cryptographically linked (chained) to its preceding block 304 such that the blocks are immutable and cannot be tampered or reproduced.

After a certain block [N−1] 304 is added to the blockchain 302, a selection process is conducted to select a forger of a subsequent block 304.

As described herein before the selection is conducted by applying the deterministic selection function F to the participation transactions extracted from a first subset of blocks 310 comprising a predefined number of blocks, for example, 6 blocks which precede the block [N] 304. In particular, the first subset 310 comprises relatively mature blocks 304 which have been added to the blockchain 302 not very recently and are hence less susceptible to tampering. For example, the first subset 310 may include blocks [N−12] to [N−7]. The first subset of blocks 310 may be regarded as a sliding window which slides along the blockchain 302 as new blocks are forged and added to the blockchain 302. As such, since the selection process is based on the first subset 310 comprising several subsequent block 304, a single participation transaction may participate in a group of several subsequent selection processes. To continue the presented example, assuming the first subset 310 comprises 6 blocks, each participation transaction will participate in 6 subsequent selection processes.

To maintain the immutability and security of the blockchain 302, the blockchain agent 220 further applies the selection function F is to a manipulation of a second subset of blocks 304, for example the outcome of the hash function H applied to a second subset of blocks 312 comprising a predefined number of blocks 304, for example, 6 blocks which precede the block [N] 304. In particular, the second subset 312 comprises the most recently added blocks 304 to maintain the link between the block [N] 304 and its preceding blocks 304. For example, the second subset 310 may include blocks [N−6] to [N−1].

For example, assuming m participation transactions $T_1$, $T_2, \ldots, T_m$ are extracted from the first subset 1, the blockchain agent 220 may determine a wining participation transaction $T_w$ by applying the selection function F expressed in equation 1 below.

$$T_w = F(H(\text{Block}[N-1] \ldots \text{Block}[N-6]), T_1, \ldots, T_m) \quad \text{Equation 1:}$$

An exemplary implementation of the selection function F is presented in equation 2 below where w is an index of the wining participation transaction $T_w$. The blockchain agent 220 applies the hash function H to the second subset 312 and applies modulo operation to the computed hash value where the divisor in the modulo operation is the number m of the participation transactions extracted from the first subset 310. The outcome of the manipulation, i.e. the outcome of the module operation applied to the outcome of the hash function H applied to the second subset 312 comprising subsequent blocks 304, for example, blocks [N−6] to [N−1] is then used in the selection function F.

$$w = [(H(\text{Block}[N-1] \ldots \text{Block}[N-6])) \bmod m] + 1 \, T_w = F((T_1, T_2, \ldots, T_m), W) \quad \text{Equation 2:}$$

As described herein before the number of blocks 304 selected for the first subset 310 and/or for the second subset 312 may be predefined according to one or more of the operational parameters of the blockchain 302 and/or the blockchain network 200. Similarly, the relative location of the blocks 340 selected for the first subset 310 and/or for the second subset 312 may vary according to one or more of the operational parameters of the blockchain 302 and/or the blockchain network 200.

The blockchain agent 220 may then select the computing node 202 associated with (i.e. the computing node 202 which transmitted) the wining participation transaction $T_w$ as the forger of the block [N] 304.

In some scenarios the computing node 202 selected as the forger of the block [N] 304 fails to forge the block [N] 304. For example, the selected computing node 202 may be offline or unable to allocate the computing resources required to forge the block [N] 304. To overcome this, in case the selected computing node 202 fails to forge the block [N] 304 within a predefined time period $T_{FORGE}$ the blockchain agent 220 may conduct one or more additional selection processes to select one or more other computing nodes as forgers for forging the block [N] 304. The predefined time period $T_{FORGE}$ may be set according to one or more of the operational parameters of the blockchain 302 and/or the blockchain network 200. The predefined time period $T_{FORGE}$ may be set, for example, to 3 minutes.

Time synchronization among the computing nodes 202 of the blockchain network 200 may be essential for a plurality of blockchain protocol related aspects, issues and/or actions. To prevent divergence between local clocks of the computing nodes and achieve time synchronization, the computing nodes 202 may apply one or more synchronization protocols, for example, Network Time Protocol (NTP) and/or the like. However, even while employing such synchronization protocol(s), a time gap of tens of milliseconds bounded by constant $T_{GAP}$ may still exist between the local clocks at least some of the computing nodes 202. This may result in scenarios in which the blockchain agent 220 executed by the computing node 202 selected as the forger completes forging the block [N] 304 within the predefined time period $T_{FORGE}$, however due to the time gap $T_{GAP}$, the blockchain agent 220 executed by at least some of the other computing nodes 202 may fail to identify the completion of forging since the count of the predefined time period $T_{FORGE}$ at these computing nodes 202 has already expired.

To overcome this an adjusted predefined time period $T'_{FORGE}$ may be set to $T_{FORGE} + T_{GAP}$ to ensure that the blockchain agent 220 executed by at least a majority of the computing nodes 202 identify the completion of forging the block [N] 304 within the adjusted predefined time period $T_{FORGE}$. Moreover, even if, in the unlikely event that the blockchain agent 220 executed by one or more of the computing nodes 202 fail to identify the completion of forging the block [N] 304 within the adjusted predefined time period $T'_{FORGE}$, the majority of computing nodes 202 still concur (approve) the block [N] 304 forged and added to the blockchain 302. The blockchain agents 220 which failed to identify the completion of forging the block [N] 304 may temporarily stray for the agreed path of the blockchain 302, however these blockchain agents 220 will join the path of the blockchain 302 approved by the majority of computing nodes 202.

Moreover, when conducting the additional selection process(es), the blockchain agent 220 may exclude the wining participation transaction $T_w$ selected in the first selection process. Optionally, the blockchain agent 220 further excludes from the additional selection process(es) one or more additional participation transactions extracted from the first subset 310 which are associated with the computing node 202 associated with the winning participation transaction $T_w$ selected in the first selection process, i.e., the computing node 202 which failed to forge the block [N] 304.

Optionally, the predefined time period $T_{FORGE}$ is increased, in particular in case the computing node 202 selected as the forger of the block [N] 304 fails to forge the block [N] 304 within the predefined time period $T_{FORGE}$ As such the computing node selected to forge the block [N] 304 in the additional selection process(es) may be granted the increased time period to forge the block [N] 304. For example, the predefined time period $T_{FORGE}$ initially set to 3 minutes may be increased to 6 minutes. In this example, while the computing node 202 originally selected (and failed) to forge the block [N] 304 was granted 3 minutes to forge the, the computing node 202 selected in the additional selection process(es) may be granted block [N] 304 6 minutes to forge the block [N] 304.

Optionally, the predefined time period $T_{FORGE}$ is set to prevent the forger of the block [N−1] 304 which may be a malicious node from fraudulently manipulating the result of the selection function F applied to select the forger of the block [N] 304 in attempt to select a specific computing mode 202 to forge the block [N] 304. The forger of the block [N−1] 304 may have disproportional advantage over the other computing nodes 202 and may use this advantage to select the specific computing mode 202 with which the malicious node 202 may collude, for example, agree to share the reward due for forging the block [N] 304 with the specific computing mode 202 selected to forge the block [N] 304. The malicious computing node 202 may experiment with possible values for the block [N−1] 304 to result in an outcome of the hash function H used in the selection function F that will select the specific computing mode 202. Setting the predefined time period $T_{FORGE}$ to a value that may be insufficient for experimenting with the selection function F applied to select the forger of the block [N] 304 and/or from communicating between colluding computing nodes 202 may therefore prevent the malicious computing node 202 from attempting and/or succeeding in fraudulently manipulating the result of the selection function F.

Optionally, the blockchain agent 220 applies the selection function to a third subset of blocks comprising blocks 304 which are shifted compared to the first subset and/or to the second subset 312. This means that the selection function may be applied to more mature blocks that may include participation transactions associated with more stable and/or reliable computing nodes 202 compared to the computing nodes 202 which submitted more recent participation transactions. In particular, the blockchain agent 220 may apply the selection function to the shifted subset(s) in case the computing node 202 selected to forge the block [N] 304 fails to do so. The third subset of blocks may overlap or not with the first subset 310 and/or the second subset 312. The amount of shifting of the third subset may be set according to one or more of the operational parameters of the blockchain 302 and/or the blockchain network 200. For example, assuming the first subset 310 includes the blocks [N−12] to [N−7], the shifted first subset 310 may include blocks [N−24] to [N−19]. In another example, assuming the second subset 312 includes the blocks [N−6] to [N−1], the shifted first subset 310 may include blocks [N−18] to [N−13].

Optionally, in order to prevent a malicious colluding attack, the computing node 202 selected as the forger shares a reward it is expected to receive for forging the block [N] 304 with one or more other computing nodes 202. Specifically, the other computing node(s) 202 with which the reward is to be shared are selected during another selection conducted after the block [N] 304 is forged and added to the blockchain 302 and after further one or more blocks 304 succeeding the block [N] 304 are added to the blockchain 302, for example, a block [N+1] 304 as seen in FIG. 3B. This may significantly deter the forger of the block [N−1] 304 which may be a malicious computing node 202 from fraudulently manipulating the block [N−1] such that the outcome of the hash function H used in the selection function F is directed to select a specific computing mode 202 as described herein above for forging block [N].

The blockchain agent 220 may select the other computing node(s) 202 with which the forger of the block [N] 304 shares its reward by applying the selection function F to the outcome of one or more other hash functions applied to a subset of the blocks 304 comprising the blocks [N] and [N+1] among other block 304. For example, assuming the forger of the block [N] 304 is defined to share its reward with k computing nodes 202 (k≥1), the blockchain agent 220 may apply k hash function $H_1, H_2, \ldots, H_k$ to a subset of the blocks 304, for example, $H_i(\text{Block}[N+1] \ldots \text{Block}[N-12])$ such that each computing nodes 202 i of the k computing nodes 202 selected to share the reward with the forger of the block [N] 304 is associated with winning participation transactions $T_w$, selected according to equation 3 below.

$$w_i = [(H_i(\text{Block}[N+1] \ldots \text{Block}[N-12])) \bmod m] + 1 \, T_{w_i} = F_i(T_1, T_2, \ldots, T_m), w_i) \quad \text{Equation 3:}$$

Since the winning participation transactions $T_w$, are selected based on the blocks [N] and [N+1] 304 (among others), the malicious computing mode 202, having the advantage in forging the block [N−1] in order to direct the selection function F applied to select a specific forger of the block [N] 304, has no such advantage for the manipulating the blocks [N] and [N+1] 304 to produce an outcome of the hash functions $H_i$ used in the selection functions $F_i$ applied to select k participation transactions $T_{w_i}$. The malicious computing mode 202 may therefore be unable to collude with k multiple computing nodes 202, in particular, the malicious computing node 202 is not able to predict the k multiple computing nodes 202 at the time of forging the block [N−1]. This method further disables collusion opportunities. The method can be extended further, for example by relying on block [N+2], . . . , block [N+z] in selecting the k computing nodes 202 where z>0 is a constant chosen based on one or more of the operational parameters (characteristics) of the blockchain network 200. For example, in a blockchain network having trustworthy computing nodes 202, the value of z may be significantly small, e.g., 1 or 2.

Optionally, in order to further limit the dominancy of a potential malicious node 202 which forged the block [N−1], the blockchain agent 220 may reduce the contribution of the block [N−1] by selecting the forger of the block 304 based on a voting algorithm applied to a plurality of blocks 304 preceding the block 304. The voting algorithm is applied to identify a winning participation transaction $T_w$ based on a separate manipulation of each of the blocks 304 of a fourth subset comprising a predefined number of blocks 304.

As seen in FIG. 3C, a fourth subset 314 comprising a predefined number of blocks 304, for example, 18 blocks 304 include blocks [N−18] to [N−1] preceding the block 304 may be defined for the voting algorithm. The blockchain agent 220 may select a respective winning participation transaction $T_{w_i}$ in each block 304 of the fourth set 314 according to manipulation of each block 304, for example, applying a hash function H to compute a hash value for each block 304 and applying a modulo operation to the computed hash value. As such the blockchain agent 220 may apply the hash function H to each block $N_i$ 304 of the fourth subset 314 and select the respective winning participation transaction $T_{w_i}$ by applying the modulo operation to the hash value as formulated in equation 4 below. As explained herein before, the divisor in the modulo operation may be the number m of the participation transactions extracted from the first subset 310

$$w_i = [(H(\text{Block}[N_i])) \bmod m] + 1 \quad \text{Equation 4:}$$

The blockchain agent 220 may then aggregate a count of the winning participation transactions $T_{w_i}$ selected in each of the blocks 304 of the fourth subset 314 to identify a highest winning participation transaction $T_{w_i}$ which is selected as the winning participation transaction $T_w$ in a highest number of blocks 304 of the fourth subset 314. The blockchain agent 220 may select the computing node 202 associated with the highest winning participation transaction $T_{w_i}$ as the forger of the block [N] 304.

Moreover, in order to reduce a probability of a tie situation between two or more winning participation transactions $T_w$ having an equal count of respective winning participation transaction $T_{w_i}$ voted in the blocks $N_i$ 304 of the fourth set 314, the blockchain agent 220 may apply a plurality of different manipulation to each of the blocks 304 in the fourth subset 314. For example, the blockchain agent 220 may apply k hash functions $H_1, H_2, \ldots, H_k$ to each of the block $N_i$ 304 of the block $N_i$ 304 of the fourth subset 314 endowing each block $N_i$ with k votes since the blockchain agent 220 applies the k hash functions where each hash function $H_i$ yields a respective vote towards a winning participation transaction.

The blockchain agent 220 may then aggregate the count of the winning participation transactions $T_{w_i}$ selected in each of the blocks 304 of the fourth subset 314 using each of the k hash function $H_i$ to identify the highest winning participation transaction $T_w$ which is selected as the winning participation transaction $T_w$ in the highest number of computations of the k hash function $H_i$ over the blocks $N_1$ 304 of the fourth subset 314. The blockchain agent 220 may select the computing node 202 associated with the highest winning participation transaction $T_{w_i}$ as the forger of the block [N] 304.

Optionally, in case of a tie between one or more winning participation transactions $T_w$, the blockchain agent 220 may select as the forger of the block [N] 304 a computing node 202 associated with a certain one of the tied winning participation transactions $T_w$ according to one or more operational parameters as defined by one or more selection rules. For example, the blockchain agent 220 may select the forger to be a computing node 202 associated with the tied wining participation transaction and having a lowest identifier in the blockchain network 200, i.e. a lowest value public key, a lowest value address and/or the like. In another example, the blockchain agent 220 may select the forger to be a computing node 202 associated with the tied wining participation transaction and which forged a higher number of blocks in the past. In another example, the blockchain agent 220 may select the forger to be a computing node 202 associated with the tied wining participation transaction and which submitted the highest number of participation transactions for participating in the specific selection process conducted to select the forger of the block [N] 304.

Optionally, the blockchain agent 220 applies the selection function to select multiple forgers from the plurality of computing nodes 202 for forging multiple blocks 304 to be added to the blockchain 302 subsequently to the block [N-1] 304, for example, a block [N] 304, a block [N+1] 304, a block [N+2] 304 and/or the like. The blockchain agent 220 may select the multitude of computing nodes 202 for forging the multitude of block 304 subsequent to the block [N-1] 304 by applying the selection function F to the outcome of a plurality of hash functions applied to the second set 312 of blocks 304. As such the blockchain agent 220 may apply k hash function $H_1, H_2, \ldots, H_k$ ($k \geq 1$) to the second subset 312 and may use the outcome of each of the k hash function to select k winning participation transactions $T_{w_i}$ such that the k computing nodes 202 associated with the k winning participation transaction $T_{w_i}$ are selected to forge the k block 304 subsequent to the block [N+1] 304 as formulated in equation 5 below.

$$w_i = [(H_i(\text{Block}[N-1] \ldots \text{Block}[N-6])) \bmod m] + 1$$
$$T_{w_i} = F_i(T_1, T_2, \ldots, T_m),$$
Equation 5:

Optionally, the blockchain agent 220 applies the selection function using the plurality of k hash function $H_1, H_2, \ldots, H_k$ ($k \geq 1$) to the second subset 312 for selecting a computing node 202 as the forger of the block [N] 304 and one or more (up to k-1) computing nodes 202 serving as backup forgers. In case the computing node 202 selected as the forger fails to forge (create) the block [N] 304 within the predefined time period $T_{FORGE}$, a computing node 202 selected as a first backup forger may forge the block [N] 304. Moreover, in case the first backup forger fails to forge (create) the block [N] 304 within a second predefined time period $T_{FORGE}$, a computing node 202 selected as a second backup forger may forge the block [N] 304 and so on. The blockchain agent 220 may apply k hash function $H_1, H_2, \ldots, H_k$ ($k \geq 1$) to the second 312 and may use the outcome of each of the k hash function as described in equation 4 to select k winning participation transaction $T_{w_i}$ such that the k computing nodes 202 associated with the k winning participation transaction $T_{w_i}$ are selected as the forger and k-1 backup forgers.

Reference is made once again to FIG. 1.

As shown at 106, the blockchain agent 220 of the computing node 202 selected as the forger may forge the block [N] 304 and may add the block [N] 304 to the blockchain 302.

The blockchain agent 220 (of the computing node 202 selected as forger) may further post a proof of eligibility to the community of computing nodes 202 to prove it is indeed entitled (eligible) to forge the block [N] 304. The blockchain agent 220 may include the proof of eligibility in the forged block [N] 304 such that the proof of eligibility may be checked and verified by one or more other computing nodes 202. For example, assuming each of the computing nodes 202 is identified by a respective public key of a private-public key uniquely associated with the respective computing node 202. In such case the blockchain agent 220 (of the computing node 202 selected as the forger) may encrypt the proof of eligibility using the private key uniquely associated with the computing node 202 selected as the forger such that one or more of the other computing nodes 202 may verify the proof of eligibility using the public key of the computing node 202 selected as the forger. In another example, the participation transaction may be a multi-output transaction as known in the art which comprises two outputs, a first output is transmitted to the blockchain network 200 for participating in the selection process(es) and a second output is stored at the computing node 202 which submitted the participation transaction. The computing node 202 selected to forge the block 304 may prove its eligibility as the forger by redeeming the second output of the winning participation transaction in a designated transaction within the transactions included in the newly forged block 304. This enables all computing nodes to verify the eligibility of the forging computing node 202.

The computing node(s) 202 which forged the block [N] 304 may be rewarded. For example, the reward may be expressed in cryptocurrency such that a special cryptocurrency transaction may be done within block [N] 304 rewarding the computing node(s) 202 which forged the block [N] 304. For example, the reward value may be a fraction of the aggregated value of the plurality of participation transactions associated with the specific selection process in which the computing node(s) 202 selected to forge the block [N] 304 was selected. For example, assuming m participation transactions were extracted from the first subset 1 for selecting the forger of the block [N] 304. Further assuming the cryptocurrency value of a single participation transaction is M. The reward granted to the forger of each block 304 in the blockchain 302 may therefore be a 1/v·M·m where V may be selected for the blockchain 320. For example, V=6 such that the reward is ⅙·M·m. The reward granted to the forger of each block 304 may be fixed. However, the reward may optionally be adjusted according to one or more of the operational parameters of the blockchain 302 and/or the blockchain network 200. For example, the reward may be reduced in case the number of computing nodes 202 is high. In another example, the reward may depend on the length of the blockchain 302, for example, the reward may be reduced or increased as the blockchain 302 expands.

Optionally, after completing a selection process, the cryptocurrency value of the participation transactions associated with the specific selection process are erased from circulation of the cryptocurrency. This may increase the value of the cryptocurrency unit since less value is in circulation thus further rewarding (enriching) the winning computing node(s) 202.

Since the PoL is based on selecting the forger from participation transactions submitted and recorded in previous blocks 304 (first subset 310) of the blockchain 302 and further based on manipulation of preceding blocks 304 (second subset 312), the PoL may commence only after a certain number of initial blocks 304 are forged (created). In particular, the number of initial blocks 304 may be at least a sum of the number of blocks in the first subset 310 and the number of blocks in the second subset 312. The initial blocks 304 may therefore be created using one or more other selection processes, for example, Proof of Work (PoW), Proof of Stake (PoS), Proof of Burn, Proof of Storage and/or the like as known in the art. After the initial blocks 304 are created (mined), the PoL selection process may be launched by the blockchain agent 220 of one or more of the computing nodes 202 using the available initial blocks 304.

It is expected that during the life of a patent maturing from this application many relevant systems, methods and computer programs will be developed and the scope of the terms computing node, hash function are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A computer implemented method of selecting block forgers in a blockchain, comprising:
   using at least one processor of a certain one of a plurality of computing nodes connected to a blockchain network, the at least one processor is configured to execute a code for:
   receiving, from the blockchain network, a plurality of participation transactions submitted by one or more of the plurality of computing nodes for participating in at least one selection process conducted by at least a portion of the plurality of computing nodes to select at least one forger from the plurality of computing nodes to forge at least one block to be added to the blockchain; and
   determining and selecting the forger, during the at least one participated selection process to identify a respective wining participation transaction, by applying a selection function to an outcome of a hash function and a plurality of participation transactions extracted from a first subset of blocks preceding the at least one block in the blockchain, the hash function is applied to a second subset of blocks preceding the at least one block;
   wherein, in response to the at least one participated selection process, the at least one determined and selected forger forges the at least one block in the blockchain.

2. The computer implemented method of claim 1, wherein the number of blocks in the first subset of blocks and/or the number of blocks in the second subset of blocks are predefined according to at least one operational parameter of the blockchain network.

3. The computer implemented method of claim 1, wherein at least one other selection process is conducted to determine at least one other forger for forging the at least one block in case the selected forger fails to forge the at least one block within a time period predefined according to at least one operational parameter of the blockchain and/or of the blockchain network.

4. The computer implemented method of claim 3, further comprising adjusting the predefined time period to increase the time period for overcoming time synchronization gaps between the at least some computing nodes conducting the at least one selection process.

5. The computer implemented method of claim 4, further comprising the at least some computing nodes conducting the at least one selection process apply at least one synchronization protocol to maintain time synchronization with each other.

6. A computing node configured to select block forgers in a blockchain, comprising:
   a communication interface for communicating with a plurality of computing nodes connected to a blockchain network;
   a program store for storing a code; and
   at least one processor device coupled to the communication interface and to the program store, the at least one processor device is configured to executes the code, the code comprising:
   code instruction to receive, from the blockchain network, at a plurality of participation transactions submitted by one or more of the plurality of computing nodes for participating in at least one selection process conducted by at least a portion of the plurality of computing nodes to select at least one forger from the plurality of computing nodes to forge at least one block to be added to the blockchain, and code instructions to determine and select the forger, during the at least one participated selection process to identify a respective wining participation transaction, by applying a selection function to an outcome of a hash function and a plurality of participation transactions submitted by at least some of the plurality of computing nodes and extracted from a first subset of blocks preceding the at least one block in the blockchain, the hash function is applied to a second subset of blocks preceding the at least one block, wherein, in response to the at least one participated selection process, the at least one determined and selected forger forges the at least one block in the blockchain.

7. A blockchain network configured to select block forgers in a blockchain, comprising:

a plurality of computing nodes connected to a blockchain network;

wherein at least one or more of the plurality of computing nodes are adapted to receive, from the blockchain network, a plurality of participation transactions submitted by one or more of the plurality of computing nodes for participating in a plurality of selection processes conducted by at least a portion of the plurality of computing nodes to select forgers from the plurality of computing nodes to forge each of a plurality of blocks to be added to the blockchain, during each of the plurality of participated selection processes, conducted to identify a respective wining participation transaction, at least one forger is determined and selected for forging at least one of the plurality of blocks to be added to the blockchain by applying a selection function to an outcome of a hash function and a plurality of participation transactions submitted by at least one or more of the plurality of computing nodes which are extracted from a first subset of blocks preceding the respective one of the plurality of blocks to be added in the blockchain where the hash function is applied to a second subset of blocks preceding the respective block to be added; and wherein the at least one forger determined and selected in each participated selection process forges the respective block.

8. A computer program product embodied in at least one computer readable storage media well executed for selecting block forgers in a blockchain, comprising:

first program instructions executable by at least one processor to cause the at least one processor to receive, from one or more of a plurality of computing nodes connected to a blockchain network, a plurality of participation transactions submitted by the one or more computing nodes for participating in at least one selection process conducted by at least a portion of the plurality of computing nodes to select at least one forger from the plurality of computing nodes to forge at least one block to be added to the blockchain, and second program instructions executable by the at least one processor to cause the at least one processor to determine and select the forger, during the at least one participated selection process to identify a respective wining participation transaction, by applying a selection function to an outcome of a hash function and a plurality of participation transactions submitted by at least some of the plurality of computing nodes and extracted from a first subset of blocks preceding the at least one block in the blockchain, the hash function is applied to a second subset of blocks preceding the at least one block;

wherein, in response to the at least one participated selection process, the at least one determined and selected forger forges the at least one block in the blockchain.

\* \* \* \* \*